US008346241B2

(12) United States Patent
Behairy et al.

(10) Patent No.: US 8,346,241 B2
(45) Date of Patent: Jan. 1, 2013

(54) CONTROLLED MOBILE COMMUNICATION IN A SOCIALLY SENSITIVE ENVIRONMENT

(75) Inventors: Hatim M Behairy, Riyadh (SA); Sami M. Al-Humaidi, Riyadh (SA); Waleed S. Alrobian, Riyadh (SA); Adnan Al Ghammas, Riyadh (SA); Ibrahem Al Mansour, Riyadh (SA); Abdullah S. Dabail, Riyadh (SA); Mishal Al Khalifa, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 161 days.

(21) Appl. No.: 13/053,270

(22) Filed: Mar. 22, 2011

(65) Prior Publication Data

US 2012/0244874 A1    Sep. 27, 2012

(51) Int. Cl.
*H04W 4/00* (2009.01)
(52) U.S. Cl. .................. 455/422.1; 455/414.1; 455/418; 455/419; 455/432.1; 455/456.1; 455/450; 455/456.3; 455/509; 455/560
(58) Field of Classification Search ............... 455/414.1, 455/414.2, 417, 418, 419, 422.1, 432.1, 456.1, 455/456.3, 456.4, 463, 560, 565
See application file for complete search history.

(56) References Cited

U.S. PATENT DOCUMENTS

| | | | | |
|---|---|---|---|---|
| 5,940,756 A * | 8/1999 | Sibecas et al. | ............. | 455/426.1 |
| 6,038,445 A * | 3/2000 | Alperovich et al. | ........ | 455/432.1 |
| 6,564,066 B1 * | 5/2003 | Biggs et al. | ................... | 455/512 |

* cited by examiner

*Primary Examiner* — Olumide T Ajibade Akonai
(74) *Attorney, Agent, or Firm* — Raj Abhyanker, P.C.

(57) ABSTRACT

A method includes identifying, through a base station controller, a mobile device when the mobile device is within a coverage area of an antenna of a base station associated with the base station controller based on an identification data of the mobile device. The method also includes determining that the mobile device is within the coverage area based on a sequence of detection of the mobile device through the antenna and another antenna when the mobile device passes an access control point to enter the coverage area, and gaining, through the base station controller, control of an access of wireless communication associated with the mobile device based on the identification data when the mobile device is within the coverage area. The control is gained through the antenna generating a signal that is stronger than a wireless signal of a cell site associated with a wireless service to the mobile device.

17 Claims, 7 Drawing Sheets

| MOBILE DEVICE 302 | IDENTITY 304 | LOCATION 306 | ACCESS 308 |
|---|---|---|---|
| MOBILE DEVICE 112₁ | 310150123456789 | COVERAGE AREA | RESTRICTED |
| MOBILE DEVICE 112₂ | 310150223456789 | OUTSIDE COVERAGE AREA | NOT IN COVERAGE AREA |
| MOBILE DEVICE 112₃ | UNKNOWN | UNKNOWN | NOT IN COVERAGE AREA |
| MOBILE DEVICE 112₄ | 310150423456789 | COVERAGE AREA | GRANTED |
| ... | ... | ... | ... |

DATABASE 300

FIGURE 3

CONTROLLED MOBILE COMMUNICATION IN A SOCIALLY SENSITIVE ENVIRONMENT

FIELD OF TECHNOLOGY

This disclosure relates generally to mobile communication systems and more particularly, to a method, an apparatus and/or a system of controlling mobile communication in a socially sensitive environment.

BACKGROUND

A use of a mobile phone may be restricted to a coverage area determined by a mobile network operator (MNO). However, a user of the mobile phone may have no control over how to limit, monitor and/or restrict a cellular signal within the coverage area. The aforementioned lack of control may inconvenience the user of the mobile phone and/or societal members during events within the coverage area that may require silence such as religious functions and movies. The user may wish not to be interrupted and distracted by, for example, a telephone call or a Short Message Service (SMS) message during the events.

A mobile device jammer may be employed to restrict access to a mobile device (e.g., the mobile phone discussed above) through preventing the mobile device from receiving a cellular signal from a cell tower and/or transmitting the cellular signal to the cell tower. However, the use of the mobile device jammer may be illegal in certain jurisdictions. Moreover, signals generated by the mobile device jammer to restrict access to a mobile device may disrupt the functionality of other sensitive electronic equipment (e.g., a pacemaker). As a result, the use of the mobile device jammer may be harmful to individuals, and may not be feasible in certain geographic locations.

SUMMARY

Disclosed are a method, a system and/or an apparatus to control mobile communication in a socially sensitive environment.

In one aspect, a method includes identifying, through a base station controller, a mobile device when the mobile device is within a coverage area of an antenna of a base station associated with the base station controller based on an identification data of the mobile device. The method also includes determining that the mobile device is within the coverage area based on a sequence of detection of the mobile device through the antenna and another antenna when the mobile device passes an access control point to enter the coverage area. The access control point is a point of entry into the coverage area.

Further, the method includes gaining, through the base station controller, control of an access of wireless communication associated with the mobile device based on the identification data when the mobile device is within the coverage area. The control is gained through the antenna of the base station generating a signal that is stronger than a wireless signal of a cell site associated with a wireless service to the mobile device.

In another aspect, a method includes storing a profile data associated with a mobile device in a memory associated with a base station controller and identifying, through the base station controller, the mobile device when the mobile device is within a coverage area associated with an antenna of a base station associated with the base station controller based on the stored profile data. The method also includes determining that the mobile device is inside the coverage area based on a sequence of detection of the mobile device through the antenna and another antenna when the mobile device passes an access control point to enter the coverage area and transmitting, through the antenna, a signal that is stronger than a wireless signal of a cell site associated with a wireless service to the mobile device to enable the base station controller gain control of the mobile device when the mobile device is within the coverage area.

The access control point is a point of entry into the coverage area. Further, the method includes permitting or denying, in conjunction with a mobile network operator associated with the wireless service to the mobile device, at least a portion of the wireless service to the mobile device through the base station controller upon the base station controller gaining control of the mobile device.

In yet another aspect, a system includes a base station having a first antenna associated therewith to generate a signal that is stronger than a wireless signal of a cell site associated with a wireless service to a mobile device when the mobile device is within a coverage area associated with the first antenna, and a second antenna. The system also includes a base station controller to identify the mobile device when the mobile device is within the coverage area based on an identification data associated therewith, to determine that the mobile device is within the coverage area through a sequence of detection of the mobile device through the first antenna and the second antenna when the mobile device passes an access control point to enter the coverage area, and to gain control of an access of a wireless communication associated with the mobile device based on the identification data when the mobile device is within the coverage area. The access control point is a point of entry into the coverage area.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not a limitation in the figures of accompanying drawings, in which like references indicate similar elements and in which:

FIG. 3 is a schematic view of database information associated with mobile devices stored at a server associated with the mobile communication system of FIG. 1, according to one or more embodiments.

Other features of the present embodiments will be apparent from accompanying Drawings and from the Detailed Description that follows.

DETAILED DESCRIPTION

Disclosed are a method, an apparatus and/or a system of controlling mobile communication in a socially sensitive environment. Although the present embodiments have been described with reference to specific example embodiments, it will be evident that various modifications and changes may be made to these embodiments without departing from the broader spirit and scope of the various embodiments.

Figure 1:
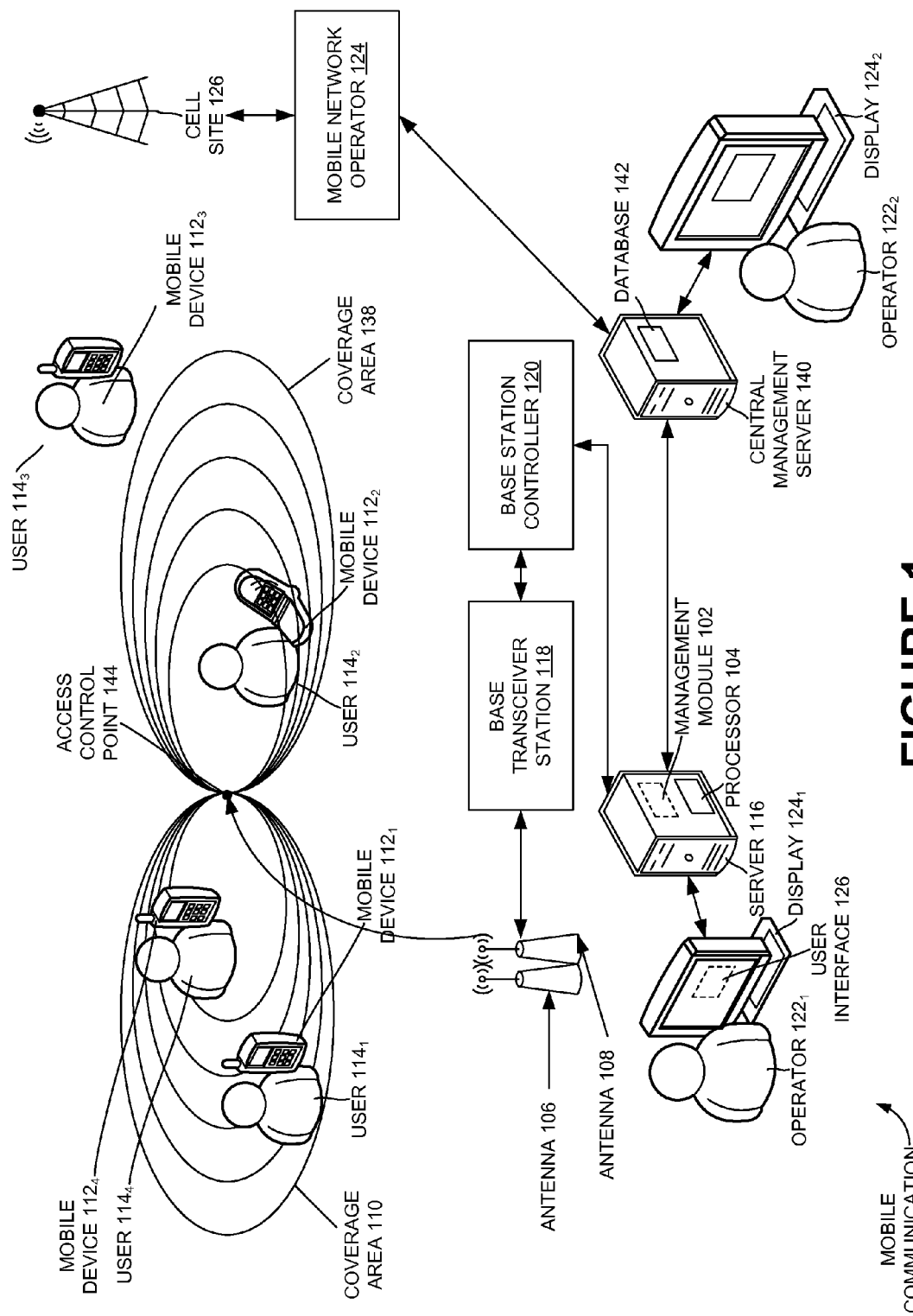
FIG. 1 is a schematic view of a mobile communication system, according to one or more embodiments.

FIG. 1 shows a mobile communication system 100, according to one or more embodiments. In one or more embodiments, mobile communication system 100 may include the requisite control equipment for communication associated therewith. In one or more embodiments, the control equipment may include a BSC 120 coupled to one or more Base Transceiver Stations (BTSs) (e.g., BTS 118) to facilitate wireless communication between a mobile device (e.g., mobile device $112_1$) and the mobile network associated therewith. In one or more embodiments, the one or more BTSs may be wireless communications station(s) installed at fixed location(s) and used to communicate as part of a wireless telephone system such as cellular Code Division Multiple Access (CDMA) and/or Global System for Mobile Communications (GSM™) cell site. A wireless telephone base station may communicate with a mobile or hand-held phone.

In one or more embodiments, the "intelligence" associated with BTS 118 may be provided through BSC 120. In one or more embodiments, BSC 120 may handle allocation of radio channel(s) to mobile device $112_1$ and/or receive measurements therefrom. In an example embodiment, a management module 102 associated with BSC 120 may execute on a server 116 associated therewith. In one or more embodiments, server 116 may be an application server, e-mail server, communications server, web server, file server, central management server, etc. In one or more embodiments, server 116 may communicate with a mobile network operator (MNO) 124 based on a set of instructions configured to execute on a processor 104 thereon. In one example embodiment, the one or more BTSs (e.g., BTS 118) may wirelessly communicate with a remote server. In another example embodiment, server 116 may be the same as BSC 120 or processor 104 may be associated with BSC 120. In one or more embodiments, server 116 may include a memory (not shown) associated therewith.

In one example embodiment, the one or more BTSs may be coupled to the BSC 120 through a local area network (LAN). In one or more embodiments, each BTS may include one or more antennas associated therewith (e.g., antenna 106, antenna 108) having coverage area(s) (e.g., coverage area 110, coverage area 138) associated therewith. As shown in FIG. 1, coverage area 110 may be associated with antenna 106 and coverage area 138 may be associated with antenna 108. In one or more embodiments, the aforementioned coverage areas (e.g., coverage area 110, coverage area 138) may be area(s) where the power transmitted from the corresponding antenna(s) is above a threshold value. As will be implied below, in one or more embodiments, the threshold value may be based on a wireless signal from MNO 124. In one or more embodiments, BTS 118 may be a femtocell or a picocell.

In one or more embodiments, BSC 120 may determine an identity of mobile device $112_1$ when mobile device $112_1$ is within coverage area 110 and coverage area 138. In one or more embodiments, the location of mobile device $112_1$ may be traced to coverage area 110 and coverage area 138 based on a detection thereof through antenna 106 and antenna 108 respectively. In one or more embodiments, a point of entry into coverage area 110 from coverage area 138 and vice versa may be termed as an access control point 144. In one or more embodiments, coverage area 110 and coverage area 138 may be controlled through BSC 120. For example, coverage area 110 may be associated with a place of worship (e.g., church, mosque, temple), a meeting room or a movie theater, and access control point 144 may be a door, a turnstile, a parking gate, an elevator or any other location associated with coverage area 110 where wireless access is monitored.

In one or more embodiments, BSC 120 may permit control of an access of a wireless signal of mobile device $112_1$ when mobile device $112_1$ is traced to be within coverage area 110. In one or more embodiments, the aforementioned control permission may be based on the identity (e.g., based on the International Mobile Subscriber Identity (IMSI) number, based on the International Mobile Station Equipment Identity (IMEI) number) of mobile device $112_1$. In one or more embodiments, as discussed above, mobile device $112_1$ may be traced to be within coverage area 110 based on the detection thereof by antenna 106. However, when user $114_1$ is outside coverage area 110, antenna 106 may not be able to detect mobile device $112_1$. Instead, in one or more embodiments, antenna 108 may detect mobile device $112_1$ within coverage area 138 associated therewith, which is substantially contiguous with coverage area 110, as shown in FIG. 1.

In one or more embodiments, when user $114_1$ is on the fringe(s) (or, periphery) of coverage area 110 without passing through access control point 144, mobile service(s) thereto may be undesirably controlled. In one or more embodiments, the presence of antenna 108 may ensure that a user on the fringe(s) of coverage area 110 may also be detected therethrough (as, for example, the user is also on the fringe(s) of coverage area 138). Therefore, in one or more embodiments, wireless service(s) to user $114_1$ may not be undesirably controlled. To summarize, in one or more embodiments, the location of user $114_1$ (or, mobile device $112_1$) may be exactly traced within coverage area 110 or coverage area 138 (and, coverage area 110 and coverage area 138 when user $114_1$ is on the fringe(s) of the coverage areas), based on a sequence of detection of mobile device $112_1$ through antenna 106 and antenna 108.

In one or more embodiments, an arrival of user $114_1$ through access control point 144 may be detected in a sequence, i.e., firstly through antenna 108 and then through antenna 106. Similarly, in one or more embodiments, when user $114_1$ passes through access control point 144 from coverage area 110 into coverage area 138, the detecting element changes from antenna 106 to antenna 108. It is obvious that more than one antenna may be associated with coverage area 110 and/or coverage area 138.

FIG. 1 shows a cell site (e.g., cell site 126) configured to provide wireless service(s) to mobile device $112_1$ when mobile device $112_1$ is not inside coverage area 110. For example, cell site 126 may include one or more antenna(s) and electronic communications equipment placed on a radio mast or tower configured to control a cell in mobile communication system 100. Cell site 126 may be coupled to MNO 124. MNO 124 may provide services for mobile phone subscribers associated with mobile communication system 100.

In the example embodiment shown in FIG. 1, when a user $114_1$ of mobile device $112_1$ enters coverage area 110 through access control point 144, the signal generated through antenna 106 may be stronger than the signal associated with cell site 126. In one or more embodiments, the aforementioned generation of the stronger signal may be controlled through BSC 120. Due to the generation of the stronger signal through antenna 106, mobile device $112_1$ may be prevented from receiving the signal from cell site 126 (or, the signal associated with the usual wireless service thereto) and from transmitting a signal thereto through BSC 120. Thus, in one or more embodiments, control of wireless service(s) to mobile device $112_1$ may be switched between BSC 120 and MNO 124 following the entry thereof into coverage area 110 through access control point 144. When user $114_1$ of mobile device $112_1$ leaves coverage area 110 to an outside area thereof (e.g., coverage area 138, outside coverage area 110 and coverage area 138), normal wireless service(s) (e.g., wireless service(s) through MNO 124/cell site 126) may be resumed. However, as seen above, in one or more embodiments, mobile device $112_1$ may be monitored through BSC 120 even when in coverage area 138.

FIG. 1 shows mobile device $112_2$ associated with user $114_2$, mobile device $112_3$ associated with user $114_3$ and mobile device $112_4$ associated with user $114_4$, in addition to mobile device $112_1$. While mobile device $112_1$ and mobile device $112_4$ may both be located inside coverage area 110, wireless service(s) associated with mobile device $112_1$ may solely be restricted, as will be discussed below. Mobile device $112_2$ and mobile device $112_3$ may both be located outside coverage area 110. Mobile device $112_2$ may be within coverage area 138 and, therefore, may be detected through antenna 108. However, the wireless service(s) thereto through MNO 124 may not be managed/controlled. Mobile device $112_3$ may be completely outside both coverage area 110 and coverage area 138. Therefore, mobile device $112_3$ may not even be detected through antenna 106 and antenna 108.

The aforementioned locations of the mobile devices (e.g., mobile device $112_1$, mobile device $112_2$, mobile device $112_3$, mobile device $112_4$) represent scenarios associated therewith. Depending on whether the mobile device(s) are within coverage area 110 and/or are known/unknown (e.g., part of a whitelist or not), control of wireless service(s) associated therewith may vary.

In one or more embodiments, BSC 120 may permit control/management of mobile device $112_1$ based on a blacklist and/or a whitelist maintained at server 116. In one or more embodiments, the whitelist may be a list and/or a register of entries associated with the mobile devices that includes information associated with particular privilege(s), service(s), mobility, access and/or recognition(s) assigned thereto. In one or more embodiments, the blacklist may be a list and/or a register of entries associated with the mobile devices that includes information associated with particular privilege(s), services(s), mobility, access and/or recognition(s) denied thereto.

In one or more embodiments, the whitelist/blacklist may be maintained at server 116 configured to execute management module 102 thereon. In one or more embodiments, the whitelist/blacklist may be hardcoded into a virtual BTS (vBTS) associated with BSC 120. In one or more embodiments, an operator $122_1$ may initialize and maintain control(s) associated with mobile communication system 100 and may monitor an activity and an availability thereof. In one or more embodiments, operator $122_1$ may interact with server 116 through a user interface 126 on a display $124_1$ associated with server 116. In one or more embodiments, profile data and/or the whitelist/blacklist associated with the mobile device(s) may be stored in server 116. In one or more embodiments, the profile data and/or the whitelist/blacklist may be shared (or, transmitted to) with a central management server 140. In one or more embodiments, central management server 140 may be associated with MNO 124. In other words, in one or more embodiments, central management server 140 may serve as an MNO interface.

In one or more embodiments, an operator $122_2$ may access and/or manage the profile data and/or the whitelist/blacklist stored in central management server 140. In one or more embodiments, operation $122_2$ may be a technical user having access to central management server 140 and the capability to monitor an activity and an availability thereof. In one or more embodiments, the profile data and/or the whitelist/blacklist may be in the form of a database 142 stored at central management server 140. In one or more embodiments, database 142 may be accessed by operator $122_2$ through a display $124_2$ associated with central management server 140. As shown in FIG. 1, management module 102 executing on server 116 may be interfaced (e.g., through a link) with central management server 140.

It is obvious that central management server 140, server 116 and/or BSC 120 may also be the same physical machine. Modifications in the location(s) of the servers and/or BSC 120 are also within the scope of the exemplary embodiments.

In an example scenario, coverage area 110 may include a classroom. Access control point 144 may be associated with, for example, the entrance door to the classroom. The aforementioned door may be a point of entry into coverage area 110 associated with antenna 106. The user(s) of mobile device(s) may include teachers and/or students associated with the classroom. When a user passes access control point 144 to enter coverage area 110, antenna 106 may detect the mobile device(s) based on identification data associated therewith after the detection through antenna 108 (again, based on the identification data). The identification data and/or the whitelist/blacklist maintained at server 116 and/or central management server 140 may be associated with students and/or teachers (or, staff) of an educational institution associated with the classroom. Specific wireless service(s) to mobile device(s) may be permitted or denied based on whether the user(s) thereof are in the whitelist/blacklist In an example embodiment, the blacklist may include students (and/or outsiders), for whom all mobile services may be disabled and the whitelist may include teachers for whom some, if not all, mobile services may be enabled.

In another example scenario, coverage area 110 may include a hospital. In one or more embodiments, the whitelist maintained at server 116 and/or central management server 140 may include all identification data associated with the doctors and the staff of the hospital, while the blacklist may include the identification data of the patients in the hospital and/or visitors associated with the patients. Thus, specific wireless service(s) to mobile device $112_1$ may be permitted or denied based on whether the user (e.g., user $114_1$) thereof is associated with the corresponding whitelist or the blacklist In an example embodiment, the blacklist may include outsiders, for whom all mobile services may be disabled and the patients/visitors, for whom some, if not all, mobile services may be disabled. The doctors and/or the staff may have all mobile services enabled.

In an example embodiment, permission associated with delivery of an advertising message may be granted to mobile device $112_1$ through BSC 120 when mobile device $112_1$ is within coverage area 110. For example, delivery of the advertising message may be based on the location of mobile device $112_1$ and/or demographic data associated with user $114_1$ of mobile device $112_1$. The demographic data, for example may be stored in server 116. The advertising message may be a Short Message Service (SMS) message or a Multimedia Message Service (MMS) message. In one or more embodiments, the demographic data of user $114_1$ of mobile device $112_1$ may be stored in correspondence with the identity of mobile device $112_1$.

In one or more embodiments, as discussed above, BSC 120 may detect movement of mobile device $112_1$ (through movement of user $114_1$) into coverage area 110. In one or more embodiments, a number of antennas may be utilized in a triangulation scheme to detect the exact location(s) of mobile device(s) within/outside/at the boundaries of coverage area 110. It is obvious that the detection scheme mentioned above and/or the number of antennas may be varied and that such variations are within the scope of the exemplary embodiments.

Figure 2:
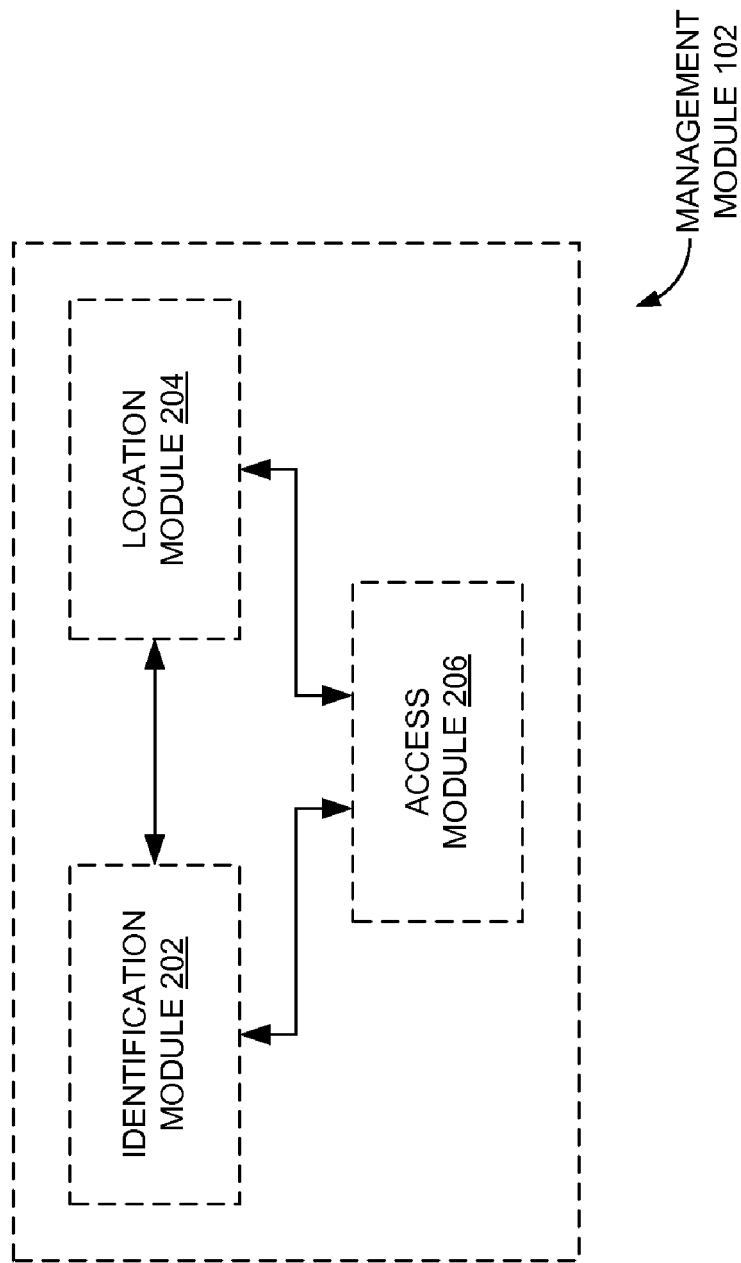
FIG. 2 is a schematic view of a management module associated with the mobile communication system of FIG. 1, according to one or more embodiments.

FIG. 2 shows management module 102, according to one or more embodiments. In one or more embodiments, through identification module 202 of management module 102 associated with BSC 120, BSC 120 may determine the identity of mobile device $112_1$ within coverage area 110 (and, coverage area 138) through the association of mobile device $112_1$ with the signal of antenna 106 (and, antenna 108) associated with BTS 118. In one or more embodiments, the identity of mobile device $112_1$ may be based on the IMSI number or the IMEI number thereof, as discussed above. In one example embodiment, identification module 202 may relay the identification information to the appropriate BTS/BSC 120 associated with server 116, where the identification information may be matched with the profile data stored.

In one or more embodiments, management module 102 may include a location module 204 to determine the location of mobile device $112_1$ based on the detection thereof by antenna 106 (and, antenna 108). In one or more embodiments, location module 204 may also determine the location of mobile device $112_1$ and notify identification module 202 when the location of mobile device $112_1$ is within coverage area 110 (and, coverage area 138).

In one or more embodiments, management module 102 may also include an access module 206 configured to enable access to the control of wireless signal(s) when mobile device $112_1$ is within coverage area 110. In one or more embodiments, access module 206 may be configured to enable access to the control of wireless signal(s) to/from mobile device $112_1$ based on the identification information thereof. It is obvious that identification module 202, location module 204 and/or access module 206 may merely reside as a set of instructions (e.g., software) on server 116. FIG. 2 also shows communication between identification module 202 and access module 206, and location module 204 and access module 206.

In one or more embodiments, upon detection of mobile device $112_1$ within coverage area 110, the appropriate BTS (e.g., BTS 118) may be configured to broadcast a control signal. As discussed above, the aforementioned control signal may be stronger than the wireless signal associated with cell site 126. Mobile device $112_1$ may, therefore, be configured to reselect the stronger signal instead of the wireless signal(s) from cell site 126. Thus, in one or more embodiments, the control unit associated with mobile communication system 100, including antenna 106, antenna 108, BTS 118, BSC 120, and/or other components associated therewith, may mimic a system including jammers to restrict access of mobile phone $112_1$.

FIG. 3 shows a database 300 of information associated with the mobile device(s) stored at server 116, according to one or more embodiments. In one or more embodiments, database 300 may include fields such as mobile device 302 (e.g., mobile device $112_1$, mobile device $112_2$, mobile device $112_3$, mobile device $112_4$), identity 304 (e.g., identification information associated with the corresponding mobile device), location 306 (e.g., location information associated with the corresponding mobile device; shown as coverage area 110, outside coverage area 110, unknown), and access 308 information (e.g., restricted, not in coverage area, granted). It is obvious that other fields may be included in database 300 and/or may substitute the fields shown in FIG. 3.

For example, mobile device $112_1$ may have unique identification information (e.g., 310150123456789) associated therewith, which may be stored at server 116. As shown in FIG. 3, when mobile device $112_1$ is within coverage area 110, access to the wireless service(s) associated therewith may be restricted through BSC 120. When mobile device $112_4$ is within coverage area 110, access to the wireless service(s) associated therewith may still be granted. The aforementioned permission and/or restriction may also be effected in conjunction with MNO 124, as discussed below.

In one or more embodiments, MNO 124 and/or third-parties may be provided access to database 300. To summarize, in one or more embodiments, mobile devices entering coverage area 110 may be interrogated through BSC 120 and the details thereof captured and stored at server 116. In one or more embodiments, the aforementioned details associated with all the mobile devices within coverage area 110 may be made available to MNO 124 and/or third parties. In one example embodiment, the wireless service(s) associated with mobile device $112_1$ may be disabled through MNO 124 when mobile device $112_1$ is within coverage area 110. In another example embodiment, the wireless service associated with mobile device $112_1$ may be rendered controllable through MNO 124 when mobile device $112_1$ is within coverage area 110.

Figure 4:
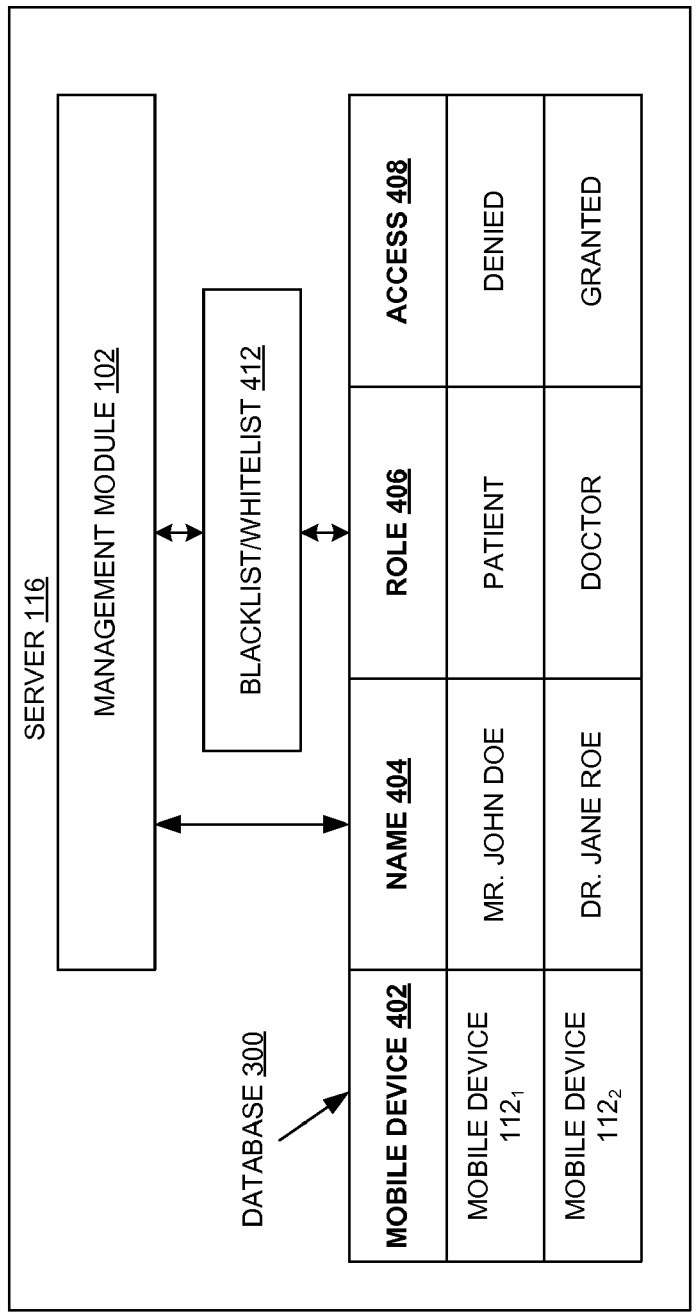
FIG. 4 is a schematic view of the server of FIGS. 1 and 3, according to one or more embodiments.

FIG. 4 shows server 116, according to one or more embodiments. In one or more embodiments, server 116 may include management module 102, as also shown in FIG. 1. In one or more embodiments, the blacklist and/or the whitelist (e.g., blacklist/whitelist 412) discussed above may be stored on server 116 and/or central management server 140. In an alternate embodiment, the blacklist and/or the whitelist may be hardcoded into a vBTS associated with BSC 120, as discussed above. In one or more embodiments, based on a presence/absence on the blacklist and/or the whitelist, mobile device $112_1$, when within coverage area 110, may be permitted or denied access to wireless service(s) associated with MNO 124 through an appropriate BTS (e.g., BTS 118; specifically, antenna 106 associated therewith) transmitting a signal stronger than the signal associated with the wireless service(s). In one or more embodiments, as shown in FIGS. 3-4, server 116 may have database 300 associated therewith, which includes information associated with the mobile devices stored therein.

FIG. 4 shows database 300 with fields such as mobile device 402 (e.g., mobile device $112_1$, mobile device $112_2$, mobile device $112_3$, mobile device $112_4$), name 404 (e.g., Mr. John Doe, Dr. Jane Doe), role 406 (e.g., doctor, patient), and access 408 (e.g., granted, denied). For example, Mr. John Doe may be a patient in a hospital and may be user $114_1$. Wireless service(s) associated with Mr. John Doe may be disabled when within coverage area 110 (here, hospital). Jane Roe may be a doctor in the hospital and may be user $114_4$. Wireless service(s) associated with Dr. Jane Roe may be enabled even when within coverage area 110 (again, here, hospital). Again, it is obvious that database 300 may be implemented in other ways, and that alternate implementations are within the scope of the exemplary embodiments discussed above.

Thus, exemplary embodiments discussed above enable control of access of wireless service(s) to mobile devices when the aforementioned mobile devices are within regions requiring social sensitivity (e.g., regions including prayer halls, religious places of worship, cinema halls, hospitals, classrooms).

Figure 5:
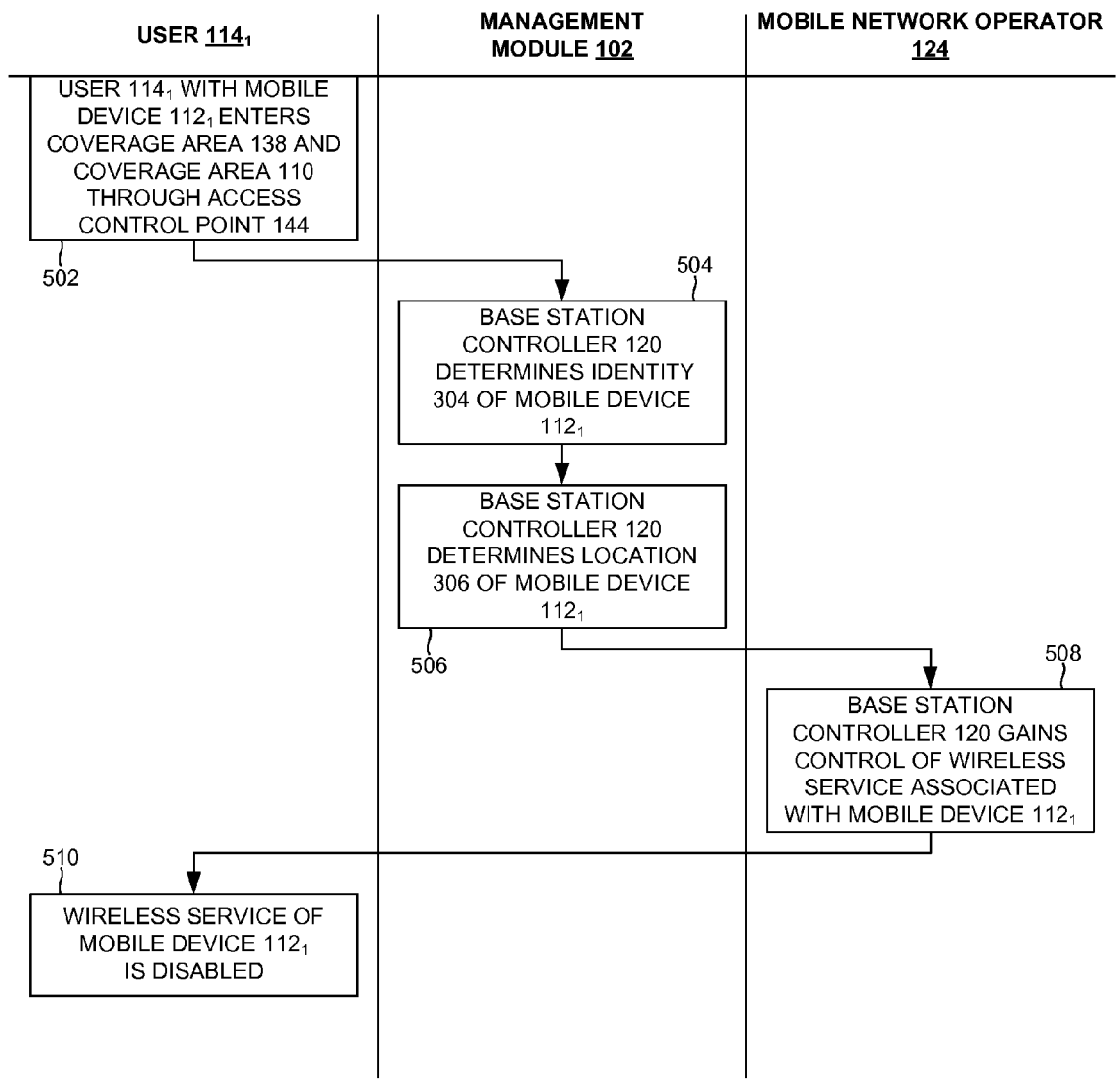
FIG. 5 is a data flow diagram associated with controlling wireless service of a mobile device in the e mobile communication system of FIG. 1, according to one or more embodiments.

FIG. 5 shows a data flow diagram associated with controlling the wireless service of a mobile device $112_1$, according to one or more embodiments. In one or more embodiments, in operation 502, user $114_1$ with mobile device $112_1$ may enter coverage area 138 and coverage area 110 (e.g., through access control point 144). In one or more embodiments, in operation 504, BSC 120 determines the identity (e.g., identity 304) of mobile device $112_1$. Then, in one or more embodiments, in operation 506, BSC 120 may determine the location (e.g., location 306) of mobile device $112_1$ within coverage area 110 based on the detection thereof through antenna 106. In one or more embodiments, in operation 508, BSC 120 may gain control of the wireless service(s) associated with mobile device $112_1$. In one or more embodiments, in operation 510, the wireless service(s) associated with mobile device $112_1$ may be disabled through BSC 120 in conjunction with MNO 124.

As shown in FIG. 5, operations 502 and 510 are at the user (e.g., user $114_1$) level, operations 504 and 506 are at management module 102 level and operation 508 is at MNO 124 level. It is obvious that FIG. 5 is merely an example, and that other forms of control (e.g., enabling access, enabling partial access, disabling partial access) are well within the scope of the exemplary embodiments.

Figure 6:
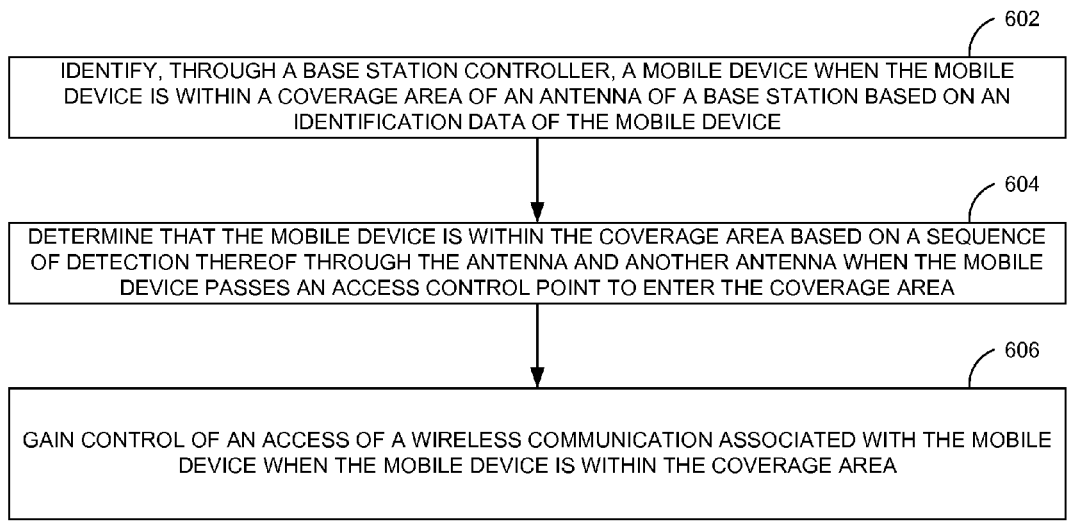
FIG. 6 is a process flow diagram detailing the operations involved in a method of gaining control of an access of a wireless service to a mobile device, according to one or more embodiments.

FIG. 6 shows a process flow diagram detailing the operations involved in a method of gaining control of an access of a wireless service to a mobile device $112_1$, according to one or more embodiments. In one or more embodiments, operation 602 may involve identifying, through BSC 120, mobile device $112_1$ when mobile device $112_1$ is within coverage area 110 of antenna 106 of a base station (e.g., BTS 118) associated with BSC 120 based on an identification data of mobile device $112_1$.

In one or more embodiments, operation 604 may involve determining that mobile device $112_1$ is within coverage area 110 based on a sequence of detection of mobile device $112_1$ through antenna 106 and antenna 108 when mobile device $112_1$ passes an access control point 144 to enter coverage area 110. In one or more embodiments, access control point 144 may be a point of entry into coverage area 110. In one or more embodiments, operation 606 then may involve gaining, through BSC 120, control of an access of wireless communication associated with mobile device $112_1$ based on the identification data when mobile device $112_1$ is within coverage area 110. In one or more embodiments, the control may be gained through antenna 106 generating a signal that is stronger than a wireless signal of a cell site 126 associated with a wireless service to mobile device $112_1$.

Figure 7:
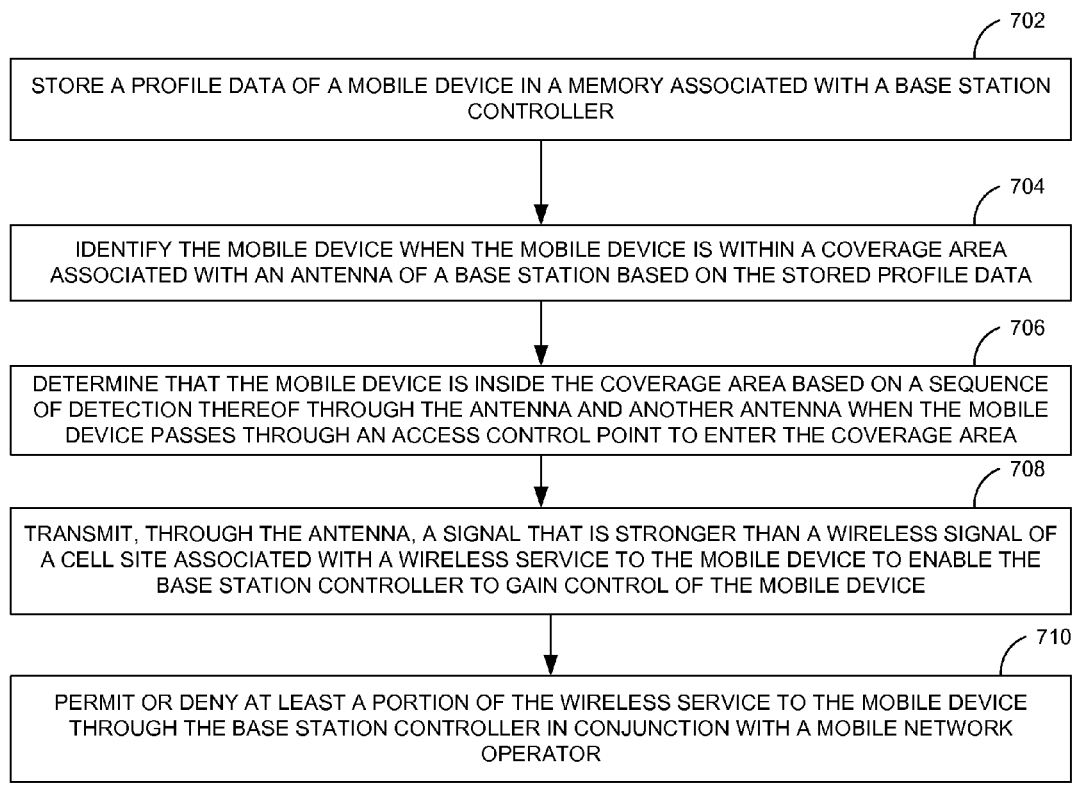
FIG. 7 is a process flow diagram detailing the operations involved in a method of permitting/denying access to a wireless service associated with a mobile device, according to one or more embodiments.

FIG. 7 shows a process flow diagram detailing the operations involved in a method of permitting/denying access to a wireless service associated with a mobile device $112_1$, according to one or more embodiments, according to one or more embodiments. In one or more embodiments, operation 702 may involve storing a profile data associated with mobile device $112_1$ in a memory associated with BSC 120. In one or more embodiments, operation 704 may involve identifying, through BSC 120, mobile device $112_1$ when mobile device $112_1$ is within a coverage area 110 associated with a antenna 106 of a base station (e.g., BTS 118) associated with BSC 120 based on the stored profile data.

In one or more embodiments, operation 706 may involve determining that mobile device $112_1$ is inside coverage area 110 based on a sequence of detection of mobile device $112_1$ through antenna 106 and antenna 108 when mobile device $112_1$ passes an access control point 144 to enter coverage area 110. In one or more embodiments, access control point 144 may be a point of entry into coverage area 110. In one or more embodiments, operation 708 may involve transmitting, through antenna 106 of the base station, a signal that is stronger than a wireless signal of a cell site 126 associated with a wireless service to mobile device $112_1$ to enable BSC 120 gain control of mobile device $112_1$ when mobile device $112_1$ is within coverage area 110.

In one or more embodiments, operation 710 may then involve permitting or denying, in conjunction with an MNO (e.g., MNO 124) associated with the wireless service to mobile device $112_1$, at least a portion of the wireless service to mobile device $112_1$ through BSC 120 upon BSC 120 gaining control of the mobile device $112_1$.

Although the present embodiments have been described with reference to specific example embodiments, it will be evident that various modifications may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium)

In addition, it will be appreciated that the various operations, processes, and methods disclosed herein may be embodied in a machine-readable medium and/or a machine accessible medium compatible with a data processing system (e.g., computer devices), and may be performed in any order (e.g., including means for achieving the various operations). Accordingly, the specification and the drawings are regarded in an illustrative rather than a restrictive sense.

What is claimed is:

1. A method comprising: identifying, through a base station controller, a mobile device when the mobile device is within a coverage area associated with an antenna of a base station associated with the base station controller based on an identification data of the mobile device; determining that the mobile device is within the coverage area based on a sequence of detection of the mobile device through the antenna and another antenna when the mobile device passes an access control point to enter the coverage area, the access control point being a point of entry into the coverage area; and gaining, through the base station controller, control of an access of wireless communication associated with the mobile device based on the identification data when the mobile device is within the coverage area, the control being gained through the antenna of the base station generating a signal that is stronger than a wireless signal of a cell site associated with a wireless service to the mobile device; wherein the sequence of detection of the mobile device through the antenna and the another antenna includes detecting that the mobile device is approaching the access control point into the coverage area of the antenna through the another antenna, wherein the another antenna includes a corresponding another coverage area associated therewith.

2. The method of claim 1, further comprising storing a profile data associated with the mobile device in a memory associated with the base station controller.

3. The method of claim 1 wherein the identification data of the mobile device is one of an International Mobile Subscriber Identity (IMSI) number and an International Mobile Station Equipment Identity (IMEI) number.

4. The method of claim 2, wherein gaining control of the access of wireless communication associated with the mobile device includes one of permitting and denying at least some portion of the wireless communication to the mobile device based on the stored profile data, the one of permitting and denying the at least some portion of the wireless communication being effected through the base station controller in conjunction with a mobile network operator associated with the wireless service to the mobile device.

5. The method of claim 2, further comprising:
permitting, through the base station controller, delivery of an advertising message to the mobile device based on a location thereof inside the coverage area and a demographic data of the user thereof,
wherein the advertising message is one of a Short Message Service (SMS) message and a Multimedia Message Service (MMS) message, and
wherein the demographic data of the user of the mobile device is determinable from the memory associated with the base station controller based on the identity of the mobile device.

6. The method of claim 1, further comprising detecting the mobile device in at least one of a boundary of the coverage area, the coverage area and the another coverage area through a plurality of antennas configured to be part of a triangulation scheme therefor.

7. The method of claim 4, further comprising:
maintaining at least one of a blacklist and a whitelist associated with a user data of the mobile device in the memory to correspondingly one of permit and deny the at least some portion of the wireless communication to the mobile device.

8. The method of claim 4, further comprising providing at least a portion of the stored profile data to be accessible to the mobile network operator.

9. The method of claim 8, wherein providing at least the portion of the stored profile data to be accessible to the mobile network operator includes permitting access of at least the portion of the stored profile data such that at least a partial disablement of the wireless service of the mobile device is actionable through the mobile network operator when the mobile device is within the coverage area.

10. A method comprising: storing a profile data associated with a mobile device in a memory associated with a base station controller; identifying, through the base station controller, the mobile device when the mobile device is within a coverage area associated with an antenna of a base station associated with the base station controller based on the stored profile data; determining that the mobile device is inside the coverage area based on a sequence of detection of the mobile device through the antenna and another antenna when the mobile device passes an access control point to enter the coverage area, the access control point being a point of entry into the coverage area; transmitting, through the antenna of the base station, a signal that is stronger than a wireless signal of a cell site associated with a wireless service to the mobile device to enable the base station controller gain control of the mobile device when the mobile device is within the coverage area; and one of permitting and denying, in conjunction with a mobile network operator associated with the wireless service to the mobile device, at least a portion of the wireless service to the mobile device through the base station controller upon the base station controller gaining control of the mobile device; wherein the sequence of detection of the mobile device through the antenna and the another antenna includes detecting that the mobile device is approaching the access control point into the coverage area of the antenna through the another antenna, wherein the another antenna includes a corresponding another coverage area associated therewith.

11. The method of claim 10, wherein the identity of the mobile device is one of an IMSI number and an IMEI number.

12. The method of claim 10, further comprising providing at least a portion of the stored profile data to be accessible to the mobile network operator.

13. The method of claim 10, further comprising detecting the mobile device in at least one of a boundary of the coverage area, the coverage area, and the another coverage area through a plurality of antennas configured to be part of a triangulation scheme therefor.

14. A system comprising: a base station having a first antenna associated therewith to generate a signal that is stronger than a wireless signal of a cell site associated with a wireless service to a mobile device when the mobile device is within a coverage area associated with the first antenna; a second antenna; and a base station controller to identify the mobile device when the mobile device is within the coverage area based on an identification data associated therewith, to determine that the mobile device is within the coverage area based on a sequence of detection of the mobile device through the first antenna and the second antenna when the mobile device passes an access control point to enter the coverage area, and to gain control of an access of a wireless communication associated with the mobile device based on the identification data when the mobile device is within the coverage area, the access control point being a point of entry into the coverage area; wherein the sequence of detection of the mobile device through the first antenna and the second antenna includes detecting that the mobile device is approaching the access control point into the coverage area of the first antenna within a corresponding another coverage area associated with the second antenna.

15. The system of claim 14, wherein the base station controller further comprises a memory associated therewith, and wherein the base station controller is configured to one of permit and deny at least some portion of the wireless communication to the mobile device based on a profile data associated with the mobile device stored in the memory.

16. The system of claim 14, wherein the identification data of the mobile device is one of an IMSI and an IMEI number.

17. The system of claim 14, further comprising a plurality of antennas configured to be part of a triangulation scheme to detect a location of the mobile device in one of a boundary of the coverage area, the coverage area and the another coverage area.

* * * * *